(12) United States Patent
Yuen et al.

(10) Patent No.: US 6,843,438 B1
(45) Date of Patent: Jan. 18, 2005

(54) OSCILLATION MECHANISM FOR FISHING REEL

(75) Inventors: Shu-Cheong Yuen, Kwai Chung (CN); Chung Cheung, Kwai Chung (CN)

(73) Assignee: Heligear Engineering (H.K.) Company, Ltd., Hong Kong (CN)

( * ) Notice: Subject to any disclaimer, the term of this patent is extended or adjusted under 35 U.S.C. 154(b) by 35 days.

(21) Appl. No.: 10/366,901

(22) Filed: Feb. 14, 2003

(51) Int. Cl.[7] ............................................. A01K 89/01
(52) U.S. Cl. ...................................... 242/242; 242/273
(58) Field of Search ............................. 242/242, 243, 242/273, 277

(56) References Cited

U.S. PATENT DOCUMENTS

| | | | | |
|---|---|---|---|---|
| 3,094,296 A | * | 6/1963 | Nurmse | 242/242 |
| 5,118,047 A | * | 6/1992 | Carpenter et al. | 242/241 |
| 5,921,489 A | * | 7/1999 | Shibata | 242/242 |
| 6,082,650 A | * | 7/2000 | Okada et al. | 242/242 |
| 6,170,773 B1 | * | 1/2001 | Okada | 242/242 |
| 6,264,125 B1 | * | 7/2001 | Cockerham et al. | 242/242 |
| 6,394,379 B1 | * | 5/2002 | Ivie | 242/242 |

* cited by examiner

*Primary Examiner*—Emmanuel Marcelo
(74) *Attorney, Agent, or Firm*—Alix, Yale & Ristas, LLP

(57) ABSTRACT

An oscillation mechanism for a fishing reel utilizing an improved level wind bracket having a shaft mount positioned such that the overall width of a fishing reel incorporating the invention is reduced. The oscillation mechanism also reduces the juggling force which occurs during operation of a fishing reel.

15 Claims, 5 Drawing Sheets

PRIOR ART

OSCILLATION MECHANISM FOR FISHING REEL

BACKGROUND OF THE INVENTION

The present invention relates generally to fishing reels of the type having a compact design. More particularly, the present invention relates to mechanisms for selectively providing an oscillating motion to elements of fishing reels in a space saving manner.

Fishing reel design is constrained by the limited space into which the reel mechanism must be contained because of the necessary portability and balance required by the user. It is well known that complex mechanisms often require more space due to the shear number of components required. Users of fishing reels generally prefer to have a smaller reel with a lighter body. Previously, fishing reel makers have satisfied this requirement by reducing the length of the body and at the same time maintaining the necessary oscillating movement needed for line laying. However, further reduction in the length of the reel makes compaction of the desired mechanism difficult. Conventionally, in making a reel slimmer, components have generally been either made smaller or the mechanism made simpler. In addition, fishing reel makers have had to use a relatively greater amount of material in the shaft and oscillation mechanism, most notably the level wind bracket, to accomplish compaction conventionally. This greater amount of material results in a large shock force that produces a juggling motion of the reel when the oscillation mechanism is in operation. This force makes operation of the reel more difficult and generally detracts from the advantages of an otherwise smooth operation. The present invention is directed toward solving these problems.

SUMMARY OF THE INVENTION

Briefly stated the present invention in a preferred form is generally directed toward reducing the width occupied by an oscillation mechanism of a fishing reel.

The oscillation mechanism of a fishing reel utilizes a drive gear which provides the motive force to a level wind gear. Generally, a pole structure is present on the level wind gear to provide a link to transfer and convert the rotational motion of the drive gear to a linear motion in the level wind bracket. A shaft is attached to or part of the level wind bracket. The motion of the bracket allows for such things as the level laying of fishing line onto a spool attached to the shaft.

To reduce the width occupied by the mechanism, the connection between the shaft and the level wind bracket is on the side of the level wind bracket partially in line with the slot. Although the direction of the connection between the shaft and the level wind bracket does not change relative to conventional mechanisms, the repositioning of the connection reduces the thickness occupied by the level wind bracket.

An object of the invention is to provide an oscillation mechanism with a relative smaller dimension allowing reels incorporating the invention to contain more components and more complicated mechanisms.

Another object of the invention is to reduce the felt juggling force associated with conventional reels when oscillating.

BRIEF DESCRIPTION OF THE DRAWINGS

Other objects and advantages of the invention will be evident to one of ordinary skill in the art from the following detailed description with reference to the accompanying drawings, in which.

DETAILED DESCRIPTION OF THE PREFERRED EMBODIMENT

Figure 1:
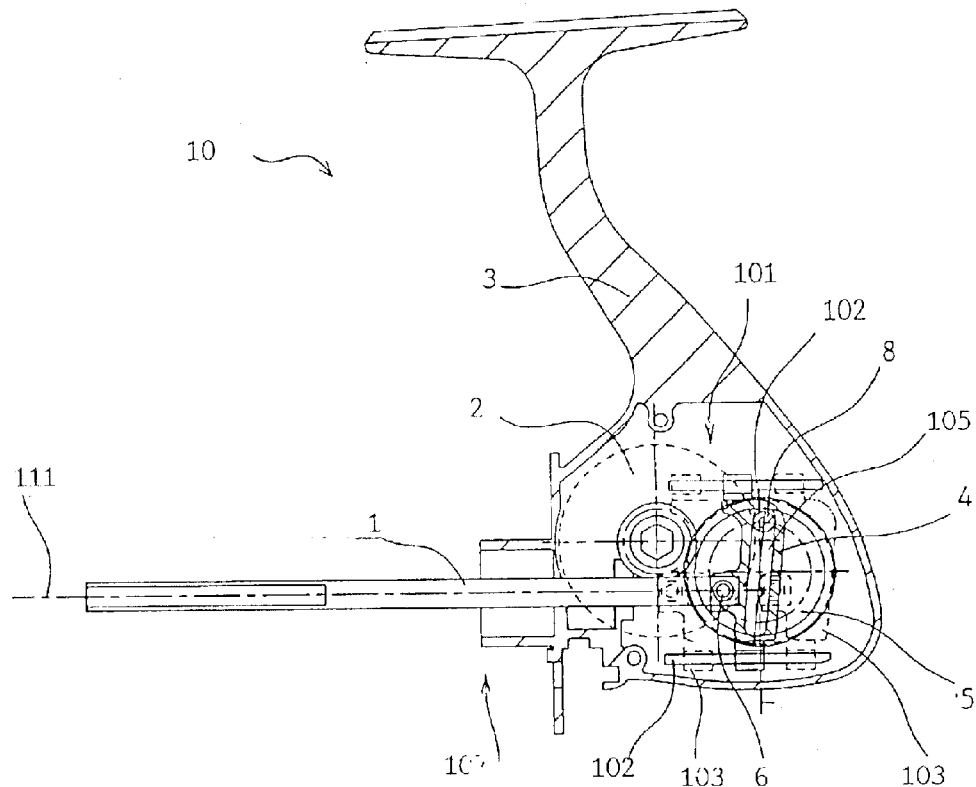
FIG. 1, is a side sectional view, partly in phantom, of a spinning fishing reel having an oscillation mechanism in accordance with the invention.

With reference to the drawings wherein like numerals represent like parts throughout the several figures, an oscillation mechanism in accordance with the present invention is generally designated by the numeral 101.

One type of fishing reel that incorporates the invention is a spinning type fishing reel with a rotor mechanism well known in the art. A fishing reel 10 has a body 3 which encases the oscillation mechanism 101. A level wind gear 5 is supported at least in part by the body 3 and is driven by a drive gear 2. The level wind gear and drive gear may interact through such things as gear teeth, frictional surfaces or through intermediary components which allow rotational force to be transmitted. A level wind bracket 4 is located on top of or in close proximity to the level wind gear and can be moved in a fore and an aft direction, as shown by the FIG. 2 arrows, along a linear path while being guided by guiding surfaces 102. The guiding surfaces may be associated with the reel body or other parts, such as the reel cover.

A slot 105 is located in the level wind bracket 4 on the side facing the level wind gear. A pole 8 is attached to, or is part of, the level wind gear and is in mechanical contact with the slot of the level wind bracket. The pole device may move inside the slot of the level wind gear. The pole device transmits and converts the rotary motion of the level wind gear to an oscillation motion of the level wind bracket. The slot 105 generally defines an area between the ends of the level wind bracket in a linear path. However, the slot may define a non-linear path wherein it has a curve or multiple curves along its length.

Locations 103 show some of the positions that the level wind bracket may take along the linear fore and aft pathway. A locking device 6 affixes a shaft 1 into a mounting surface of the level wind bracket. This ensures a solid mechanical connection between the parts. The shaft has a central axis 111 which is parallel with the fore and aft linear pathway.

The fore and aft direction is perpendicular to the rotational axis of the level wind gear 104.

Figure 2:
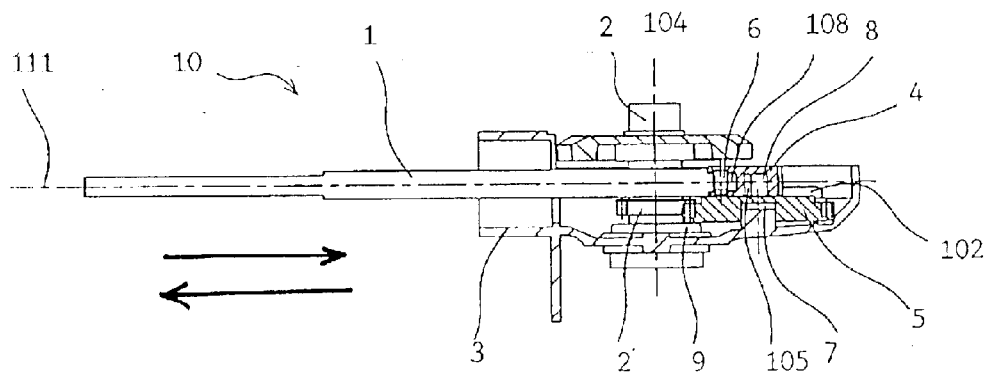
FIG. 2 is a fragmentary transverse sectional view taken from below, partly in phantom, of the spinning fishing reel of FIG. 1.

With reference to FIG. 2, the drive gear 2 in one embodiment of the invention is supported within the body by a bushing 9. A washer 7 may be present to separate the body and the level wind gear, for example, to reduce friction or wear of the surfaces. The level wind bracket 4 is driven by the pole device as the pole 8 rotates with the level wind gear.

Figure 3:
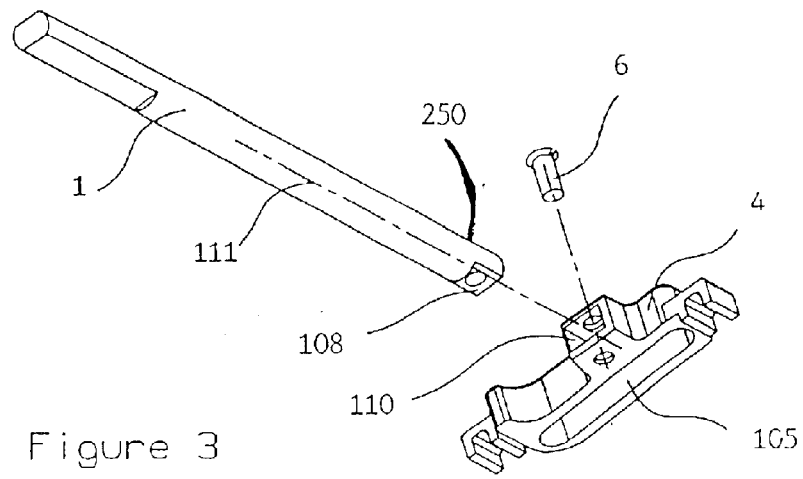
FIG. 3 is an exploded perspective view of a level wind bracket with a shaft and locking device employed with the reel of FIG. 1.

With reference to FIG. 3, the shaft may have an insert end 250 with a configured insert part 108. The insert part may be angled, sloped or beveled to ensure positive fit when it is inserted into a shaft mount 110 of the level wind bracket. The shaft mount 110 is positioned at a side of the level wind bracket and is located at a point wherein a portion of the insert part 108 is in intersecting alignment with a portion of the slot 105. The shaft having a longitudinal axis and the intersecting alignment being anywhere along the axial projection of the shaft. The shaft is affixed to the level wind bracket by the locking device 6 which may be a pin, screw, bolt or similar device.

Figure 4:
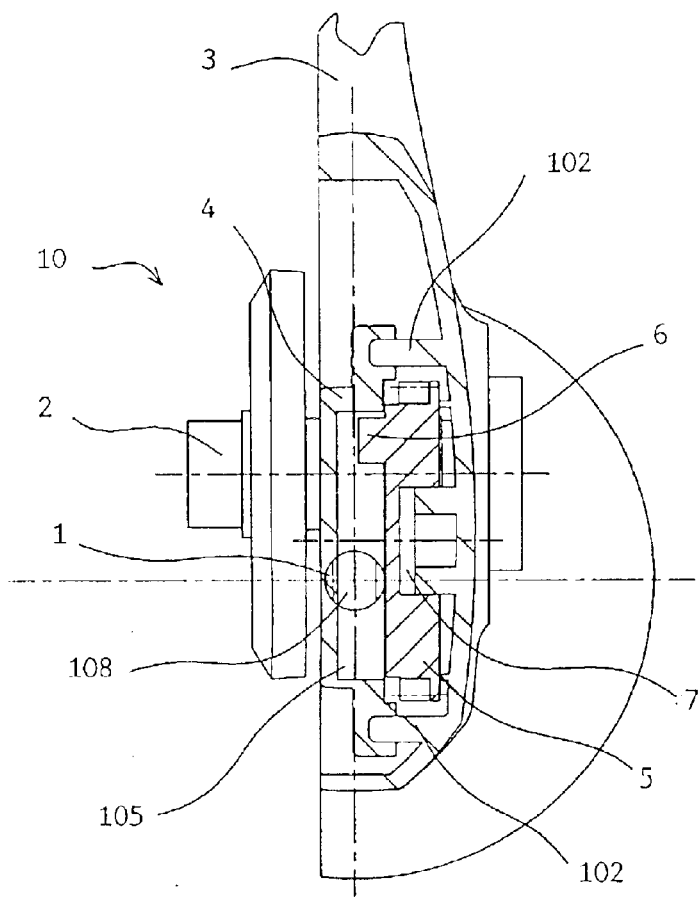
FIG. 4 is a cross sectional view from the back, partly in phantom, of a spinning fishing reel of FIG. 1.

With reference to FIG. 4, in one embodiment of the invention the pole 6 may be formed as a unitary part of the level wind gear 5.

Figure 5:
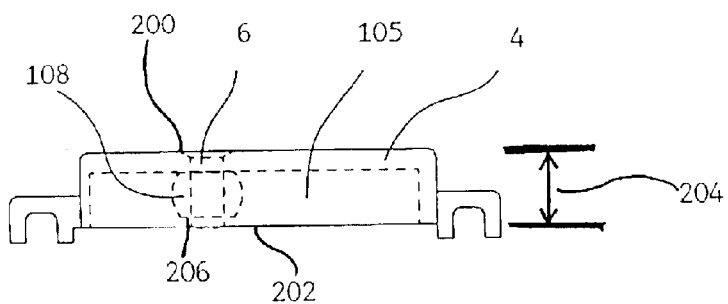
FIG. 5 is a front view, partly in phantom, and partly in diagrammatic form of a level wind bracket.

With reference to FIG. 5, in one embodiment of the invention, the level wind bracket 4 has a top surface 200 and a bottom surface 202. The shaft is attached at the shaft insert portion to the level wind bracket. The attachment point is such that a portion of the insert part 108 overlaps with a portion of the slot 105. In some cases the diameter of the shaft at the shaft insert end 250 (FIG. 3) may be substantially coextensive with the distance 204 between the top and bottom surfaces thereby providing a sleek and efficient level wind bracket shaft configuration. In other cases a portion of the diameter of the shaft may extend above or below the top and/or bottom surfaces while another portion is in intersecting alignment with the slot. The insert portion of the shaft may have a flattened or otherwise configured surface 206.

Figure 6:
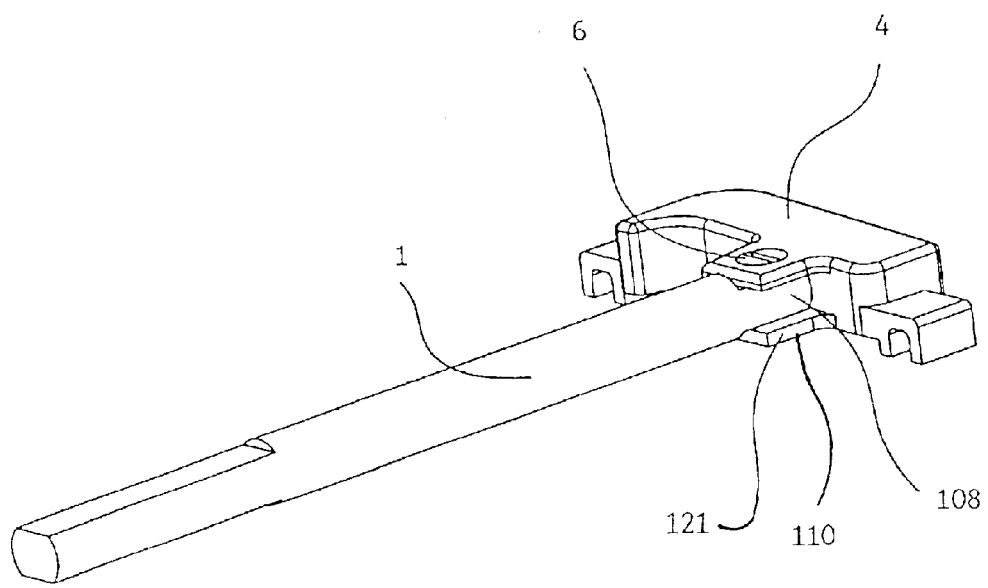
FIG. 6 is a perspective view of a level wind bracket with shaft utilizing an alternative shaft mounting surface in accordance with the invention.

With reference to FIG. 6, in one embodiment of the invention the shaft mount may be configured as a pair of flanges 121 which extend out from a side of the level wind bracket. The shaft 1 is affixed to the shaft mount with a locking device 6, which may clamp the shaft insert between the flanges in another sleek and efficient mount configuration.

Figure 7:
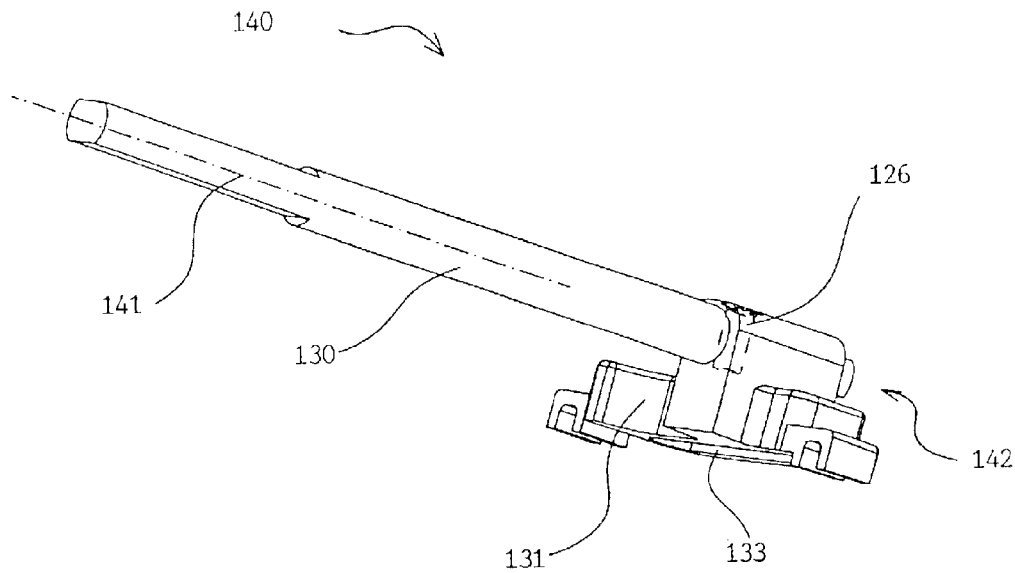
FIG. 7 is a perspective view of a prior art level wind bracket with shaft.
Figure 8:
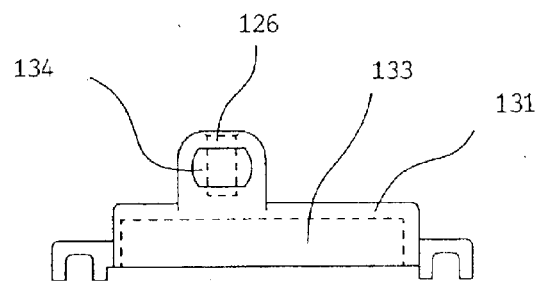
FIG. 8 is a front view, partly in phantom, of a prior art level wind bracket.

The invention may be appreciated by reference to FIG. 7 and FIG. 8 which depict prior art oscillation mechanisms. A shaft 130 is inserted in a bracket 131. In the Figures, insert part 134 of the shaft 130 is located at a position above the slot 133 of the bracket 131. It should be appreciated that a horizontal plane running along the central axis of the shaft 141 is offset from a horizontal plane passing through the slot 133. Therefore, the whole oscillation mechanism 140 occupies a greater thickness. A thicker (transverse dimension) fishing reel body is thus needed to encase the mechanism thereby also making the fishing reel body significantly bulkier and heavier.

Figure 9:
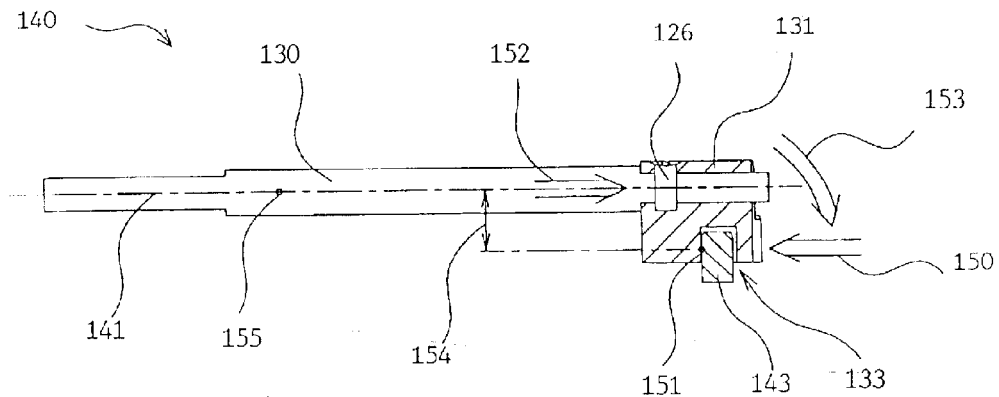
FIG. 9 is a simplified force diagram of a prior art oscillation mechanism.

The invention may be further appreciated by reference to FIG. 9 which depicts a prior art oscillation mechanism 140 with a shaft 130 having a central axis 141. The shaft is attached to the bracket 131 by a fastener 126. The pole 143 operates within the slot 133 in the bracket. When the mechanism is operated, a force 150 is transmitted from the pole to the bracket through a contact point 151. The shaft has a moving pivot point 155 on the shaft axis. A reaction force 152 is from the shaft 130 to the bracket along the shaft axis 141. Due to the conventional offset arrangement, a moment 153 against the pivot point 155 on the shaft axis is generated. The moment has a magnitude proportional to a perpendicular distance 154 between the contact point and the shaft axis.

Figure 10:
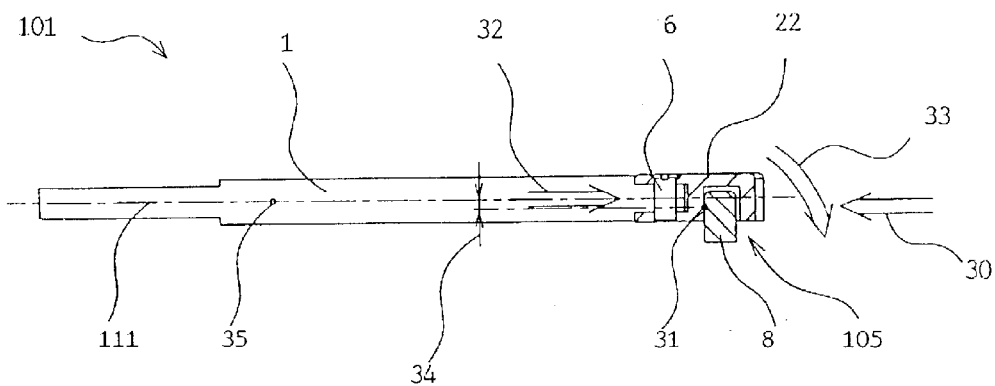
FIG. 10 is a simplified force diagram of an oscillation mechanism consistent with the present invention.

With reference to FIG. 10, the invention has an oscillation mechanism 101 with a shaft 1 having a central axis. The shaft is attached to the level wind bracket at its insert end and is held in place by a locking device. The pole 8 operates within a slot of the level wind bracket. When the mechanism is operated a force 30 is transmitted from the pole to the level wind bracket at a point of contact 31 between the pole and the level wind bracket. The shaft has a moving pivot point 35 on the shaft axis. A reaction force 32 is exerted from the shaft to the bracket along the shaft axis. A moment 33 against the pivot point is generated with a magnitude proportional to a perpendicular distance 34 between the contact point and the shaft axis. It should be appreciated that the magnitude of the moment is less than a conventional oscillation mechanism.

While the preferred embodiments have been shown to describe various modifications and substitutions may be made thereto without departing from the spirit and scope of the invention. Accordingly, it is to be understood that the present invention has been described by way of illustration and not limitation.

What is claimed is:

1. A fishing reel comprising:
   a body,
   an oscillation mechanism encased by said body, said oscillation mechanism including,
      a level wind gear with a rotational axis and a pole, said level wind gear supported by the body,
      a level wind bracket having a top and a bottom surface, an elongate slot traversing the bottom surface and extending upwardly therefrom for receiving said pole for sliding engagement therewith, said wind bracket further having a pair of guiding ends and a shaft mount comprising a pair of flanges which extend substantially coextensively with said top and bottom surfaces, said shaft mount located on a side of the level wind bracket,
      a shaft having an insert part and connected to the shaft mount so that at least a portion of an axial projection of said insert part intersects with said slot; and
   a drive gear supported by the body and in mechanical communication with the level wind gear.

2. The fishing reel of claim 1, wherein the shaft has a remote end and an insert end, said insert end is attached to the shaft mount with a locking device.

3. The fishing reel of claim 2, wherein the shaft mount is a recess which is configured to receive the shaft insert end.

4. The fishing reel of claim 1 further comprising a washer disposed between the level wind gear and the body.

5. The fishing reel of claim 1 further comprising a bushing disposed between the driving gear and the body.

6. An oscillation mechanism of claim 1, wherein the shaft has a central axis which passes through said slot.

7. A fishing reel comprising:
   a body;
   an oscillation mechanism encased by said body said oscillation mechanism including,
      a level wind gear with a rotational axis and a pole, said level wind gear supported by the body,
      a level wind bracket having a top and a bottom surface, an elongate slot traversing the bottom surface and extending upwardly therefrom for receiving said pole for sliding engagement therewith, said wind bracket further having a pair of guiding ends and a shaft mount comprising a set of flanges, said shaft mount located on a side of the level wind bracket, a shaft having an insert part and connected to the shaft mount so that at least a portion of an axial protection of said insert part intersects with said slot, said set of flanges which are configured to receive the shaft insert end; and a drive gear supported by the body and in mechanical communication with the level wind gear.

8. An oscillation mechanism for a fishing reel comprising:

a drive gear supported by a fishing reel body, said drive gear being in mechanical communication with a level wind gear, said level wind gear having a pole protecting from a surface thereof and slidingly engageable with a level wind bracket, said level wind bracket having a top surface, a bottom surface, a mounting surface, and a set of guide surfaces, said bottom and top surfaces extending between said guide surfaces, said guide surfaces being a set of grooves which are equidistantly spaced throughout, said bottom surface having level wind gear engagement surface, at least a portion of said mounting surface being in alignment with the engagement surface.

9. The oscillation mechanism of claim 8, wherein the level wind gear engagement surface is a slot.

10. The oscillation mechanism of claim 8, wherein the mounting surface defines a socket.

11. The oscillation mechanism of claim 8, wherein a shaft is fixed to the mounting surface with a locking device.

12. An oscillation mechanism of claim 8, wherein said mounting surface is located between and is substantially coextensive with the top surface and the bottom surface.

13. An oscillation mechanism for a fishing reel comprising:

a drive gear supported by a fishing reel body and in mechanical communication with a level wind gear;

a level wind bracket in mechanical connection with the level wind gear, the level wind bracket including a slot;

a shaft fixed to the level wind bracket and having a longitudinal axis such that at least a portion of an axial projection of said shaft intersects with the slot, said shaft is received by a pair of flanges projecting from the level wind bracket.

14. An oscillation mechanism of claim 13, wherein the shaft is received by a recess in the level wind bracket.

15. An oscillation mechanism of claim 13, wherein the shaft has a central axis which intersects a portion of the slot.

* * * * *

UNITED STATES PATENT AND TRADEMARK OFFICE
CERTIFICATE OF CORRECTION

PATENT NO.    : 6,843,438 B1
DATED         : January 18, 2005
INVENTOR(S)   : Yuen et al.

It is certified that error appears in the above-identified patent and that said Letters Patent is hereby corrected as shown below:

Column 4,
Line 60, after "body" insert -- , --.

Column 5,
Line 7, after "flanges" delete "which are".

Signed and Sealed this

Twenty-first Day of February, 2006

JON W. DUDAS
*Director of the United States Patent and Trademark Office*